United States Patent

Mulkens et al.

[11] Patent Number: 5,555,113
[45] Date of Patent: Sep. 10, 1996

[54] LIQUID CRYSTAL DISPLAY DEVICE WITH TWIST ANGLE φ OF 70° TO 90° AND ALIGNMENT TO POLARIZATION DIRECTION ANGLE BETWEEN φ/2+30° AND φ/2+60°

[75] Inventors: Johannes C. H. Mulkens; Ingrid E. J. R. Heynderickx, both of Eindhoven, Netherlands

[73] Assignee: U.S. Philips Corporation, New York, N.Y.

[21] Appl. No.: 321,186

[22] Filed: Oct. 11, 1994

Related U.S. Application Data

[63] Continuation-in-part of Ser. No. 166,803, Dec. 14, 1993, abandoned, which is a continuation of Ser. No. 13,483, Feb. 1, 1993, abandoned, which is a continuation of Ser. No. 942,123, Sep. 8, 1992, abandoned, which is a continuation of Ser. No. 673,871, Mar. 22, 1991, abandoned.

[30] Foreign Application Priority Data

Mar. 23, 1990 [NL] Netherlands ............. 9000686

[51] Int. Cl.⁶ ............. G02F 1/1335; G02F 1/13
[52] U.S. Cl. ............. 359/63; 359/93; 359/102
[58] Field of Search ............. 359/63, 93, 102

[56] References Cited

U.S. PATENT DOCUMENTS

| | | | |
|---|---|---|---|
| 4,609,255 | 9/1986 | Leenhouts et al. | 359/63 |
| 4,896,947 | 1/1990 | Leenhouts | 359/63 |
| 4,952,030 | 8/1990 | Nakagawa et al. | 359/63 |
| 5,105,289 | 4/1992 | Sonehara et al. | 359/63 |
| 5,139,340 | 8/1992 | Okumura | 359/63 |
| 5,150,237 | 9/1992 | Iimura et al. | 359/63 |

FOREIGN PATENT DOCUMENTS

| | | | |
|---|---|---|---|
| 3138518 | 2/1983 | German Dem. Rep. | 359/63 |
| 2098323 | 5/1987 | Japan | 359/63 |
| 0197723 | 8/1989 | Japan | 359/63 |

*Primary Examiner*—Anita Pellman Gross
*Attorney, Agent, or Firm*—John C. Fox

[57] ABSTRACT

Picture inversion in display devices based on the twisted pneumatic effect is prevented by choosing a twist angle φT such that 70°<φT<90°, and an angle α between the direction of polarization of one of the polarizers and the associated direction of orientation such that: 30°+φT/2<α<60°+φT/2.

7 Claims, 1 Drawing Sheet

LIQUID CRYSTAL DISPLAY DEVICE WITH TWIST ANGLE φ OF 70° TO 90° AND ALIGNMENT TO POLARIZATION DIRECTION ANGLE BETWEEN φ/2+30° AND φ/2+60°

RELATED APPLICATIONS

The instant application is a continuation-in-part of application Ser. No. 08/166,803 filed Dec. 14, 1993, and now abandoned, which application Ser. No. 08/166,803 was a continuation of application Ser. No. 08/013,483 filed Feb. 1, 1993 and now abandoned, which application Ser. No. 08/013,483 was a continuation of application Ser. No. 07/942,123 filed Sep. 8, 1992 and now abandoned, which application Ser. No. 07/942,123 was a continuation of application Ser. No. 07/673,871 filed Mar. 22, 1991, and now abandoned.

BACKGROUND OF THE INVENTION

The invention relates to a liquid crystal display device having a layer of liquid crystal material between two substrates provided with electrodes and orienting layers, the orienting layers giving the liquid crystal molecules at the area of the substrates such a preferred direction that the liquid crystal material has a twist angle $\phi T$ across the thickness of the layer, the device being further provided with mutually substantially perpendicular polarizers at opposite sides of the layer of liquid crystal material.

Such a device can be used, for example, in LCD television, and also in datagraphic display devices.

A device of the above-mentioned type is described, for example, in DE-A 0,264,667. This application describes how smaller twist angles $\phi T$, for example, between 10° and 80° are preferred for adjusting grey scales while larger twist angles (90° or more) are more suitable for high multiplex ratios. At low values of $d.\Delta n$ (d: thickness of the layer of liquid crystal material, $\Delta n$: birefringence or optical anisotropy of the material) and suitably chosen states of polarization, such a device provides a good contrast and little discoloration.

A drawback, notably in the case of a twist angle of 90° or more, is the fact that the contrast between crossed polarizers is angle-dependent around the normal to a front face of the display device and is considerably lower in one quadrant. Moreover, when changing the viewing angle, picture inversion occurs in the quadrant where the highest contrast is obtained due to the specific shape of the transmission/voltage characteristic in the associated viewing direction.

SUMMARY OF THE INVENTION

An object of the present invention is to provide a picture display device of the type described in the opening paragraph which does not have such a picture inversion.

Accordingly to the invention, such a device is characterized in that $40° < \phi T < 90°$ and in that the angle $\alpha$ between the direction of polarization of one of the polarizers and the direction of orientation at the area of said polarizer has such a value such that $30° + \phi T/2 < \alpha < 60° + \phi T/2$. Within this range of $\alpha$ there will be a greater contrast at a given $\phi T$ and drive voltage, while the color neutrality is substantially maintained. $\phi T$ is preferably chosen to be between 70° and 85°, however, values of $\phi T$ result in a transmission/voltage characteristic curve requiring the use of excessively high drive voltage.

Optimum results are obtained when a value of between 0.4 and 0.8 is chosen for the optical path length $d.\Delta n/\lambda$ (d: thickness of the liquid crystal layer, $\Delta n$: birefringence, $\lambda$: wavelength of the light used).

A liquid crystal cell having such parameters is particularly suitable for use in a display device operating in the so-called active drive mode. A display device suitable for this purpose is characterized in that it comprises a cross-bar system of rows and columns defining pixels at the area of the crossings, and having switches associated with the pixels via which switches voltages are applied to the pixels.

DESCRIPTION OF THE PREFERRED EMBODIMENTS

Figure 1:
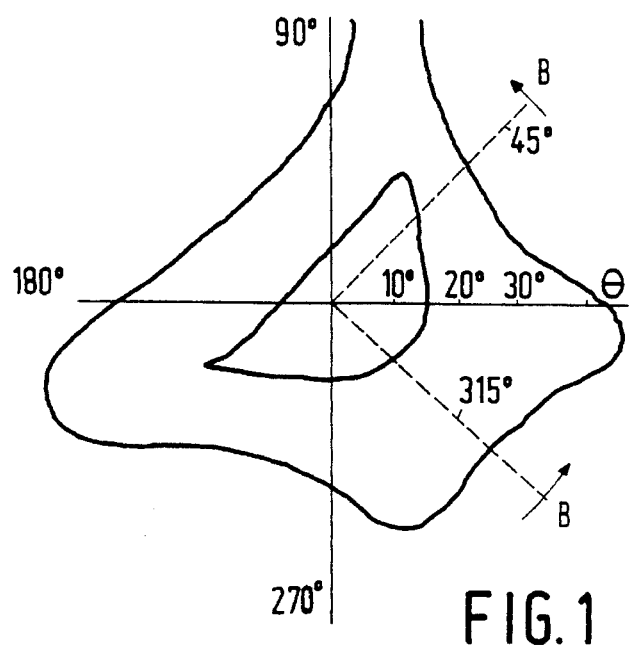
FIG. 1 shows diagrammatically iso-contrast curves for a prior art liquid crystal display device with $\phi T = 90°$.
Figure 2:
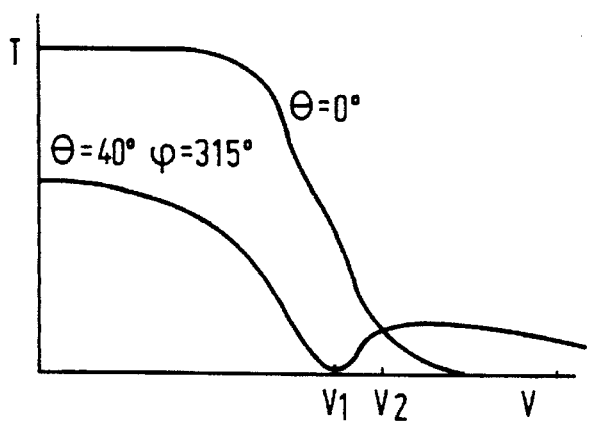
FIG. 2 shows two associated transmission/voltage characteristic curves.

FIG. 1 shows two iso-contrast curves for a prior art liquid crystal display device which $\phi T = 90°$ and $d.\Delta n = 0.48$ μm. As is apparent from the figure, these are non-rotationally symmetrical while the highest contrast values occur in practice in the fourth quadrant $(270° < \beta < 360°)$ i.e. the quadrant in which the viewing direction is located along the director in the center of the cell. However, in this quadrant the transmission/voltage characteristic curve also exhibits an angle-dependent behavior as is shown in FIG. 2. This figure shows two transmission/voltage characteristic curves, namely one in a direction perpendicular to the liquid crystal layer $(\theta=0)$ and one in the fourth quadrant $(\beta=315°)$ at an angle of $\theta$ with respect to the normal $(\theta=40°)$. It is apparent from FIG. 2 that, for example, at the voltage value $V_1$ either a dark or a grey image is observed, dependent on the angle $\theta$. However, for a voltage $V_1 > V_2$ the effect is reversed. Consequently a change of the viewing angle leads to grey scale inversion in this case. More generally, grey scale inversion is observed whenever a transmission/voltage characteristic curve has a dip in the low transmissive portion with respect to the transmission/voltage characteristic for which the grey scales are defined. Contrast changes also occur.

Figure 3A:
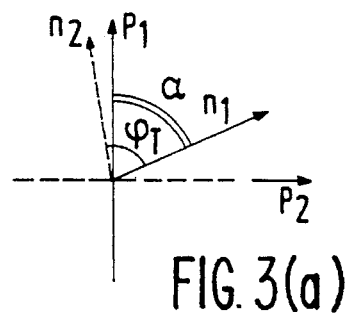
FIGS. 3a and 3b show some forms of the relationship between the directions of orientation and the directions of polarization P for a liquid crystal device of the invention.
Figure 3B:
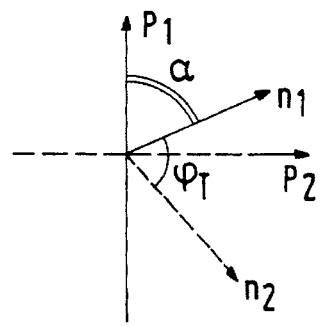

In a display device according to the invention (as shown in FIGS. 3a and 3b), this problem is solved by suitable choices of the twist angle $\phi T$ and the angle $\alpha$ between the direction of polarization $P_1$ on the front face of the device and the direction of orientation $n_1$ of the liquid crystal molecules at the area of this front face. Further in FIGS. 3a and 3b, $P_2$ and $n_2$ represent the direction of polarization and the direction of orientation at the area of the rear face and the directions $n_1$ and $n_2$ define the twist angle $\phi T$ there P1 and P2 are chosen to be perpendicular with respect to each other.

Figure 4:
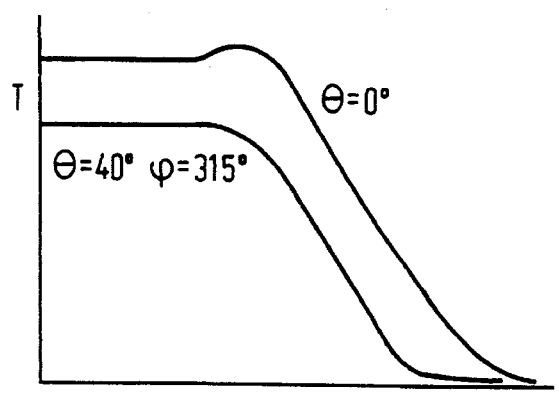
FIG. 4 shows two transmission/voltage characteristic curves of a device according to the invention.

Such a device yields the transmission/voltage characteristic curves of FIG. 4 for $\phi T = 70°$ and $d.\Delta n = 0.49$ μm for the different viewing angles indicated, i.e., $\theta = 0$ and 40° respectively. Since the two curves do not exhibit a dip, the problems described with reference to FIG. 2 no longer occur.

The value of d.Δn/λ may vary between 0.40 and 0.80 dependent on φT without the achieved advantages being lost, while also a good color neutrality is maintained. The wavelength λ is dependent on the use. In the case of irradiation with monochrome light, as in projection applications with three light sources, the peak wavelength of the used light is preferably chosen for λ. In the case of irradiation with white light, an average wavelength is chosen for λ.

What is claimed is:

1. A liquid crystal display device comprising a layer of liquid crystal material between two substrates, the substrates each being provided with electrodes and orientation means in contact with the liquid crystal material giving the liquid crystal molecules a first direction of orientation at one of said two substrates and a second direction of orientation at the other of said two substrates such that the liquid crystal material has a twist angle φT across the thickness of the layer, said device further comprising polarizers at opposite sides of the layer of liquid crystalline material having directions of polarization which cross each other substantially perpendicularly, characterized in that the twist angle has a value φT between 70° and 90° and the angle α between the direction of orientation provided by the orientation means one of the substrates is provided with and the direction of polarization of the polarizer at the same side of the layer of liquid crystal material as said orientation means has a value of α of between 30°+φT/2 and 60°+φT/2.

2. A liquid crystal display device as claimed in claim 1, characterized in that 0.4<d.Δn/λ<0.8, in which d is the thickness of the liquid crystal layer, Δn is the birefringence and λ is either the peak wavelength of a substantially monochrome light source associated with the display device or the average wavelength of a light source associated with the device.

3. A liquid crystal display device as claimed in claim 2, characterized in that the electrodes comprise a cross-bar system of rows and columns, the area of the crossings defining pixels, with switches provided at the area of the crossings, through which switching voltages are supplied to the pixels.

4. A liquid crystal display device as claimed in claim 1, characterized in that the electrodes comprise a cross-bar system of rows and columns, the areas provided at the crossings defining pixels with switches provided at the area of the crossings, through which switching voltages are applied to the pixels.

5. A liquid crystal display device comprising a layer of liquid crystal material between two substrates, the substrates being provided with electrodes and orientation means in contact with the liquid crystal material giving the liquid crystal molecules such a direction of orientation that the liquid crystal material has a twist angle φT across the thickness of the layer, said device further comprising polarizers at opposite sides of the layer of liquid crystal material having directions of polarization which cross each other perpendicularly, characterized in that 70°≦φT≦85° and the angle α between the direction of orientation provided by the orientation means on one of said substrates and the direction of polarization of the polarizer at the same side of the layer of liquid crystal material as said orientation means has a value between 30°+φT/2 and 60°+φT/2.

6. A liquid crystal display device as claimed in claim 5, characterized in that 0.4<d Δn/λ<0.8 in which d is the thickness of the liquid crystal layer, Δn is the birefringence and λ is either the peak wavelength of a substantially monochrome light source associated with the display device or the average wavelength of a light source associated with the device.

7. A liquid crystal display device as claimed in claim 5, characterized in that the electrodes comprise a cross-bar system of rows and columns, the area of the crossings defining pixels, with switches provided at the area of the crossings, through which switching voltages are supplied to the pixels.

* * * * *